United States Patent [19]
Norris

[11] 3,745,446
[45] July 10, 1973

[54] MAGNETIC LOGGING METHOD OF LOCATING LOST WELLS

[75] Inventor: William F. Norris, Tulsa, Okla.

[73] Assignee: Seismograph Service Corporation, Tulsa, Okla.

[22] Filed: Mar. 13, 1972

[21] Appl. No.: 234,053

[52] U.S. Cl. .................................. 324/3, 324/8
[51] Int. Cl. ..................... G01v 3/08, G01v 3/18
[58] Field of Search ................ 324/6, 8, 10, 43, 324/3

[56] References Cited
UNITED STATES PATENTS

| | | | |
|---|---|---|---|
| 3,317,821 | 5/1967 | Patton et al. | 324/8 |
| 3,388,323 | 6/1968 | Stripling | 324/8 |
| 3,471,777 | 10/1969 | Rona | 324/43 R |
| 3,488,574 | 1/1970 | Tanguy | 324/10 X |

Primary Examiner—Gerard R. Strecker
Attorney—C. Frederick Leydig, Philip H. Mayer, et al.

[57] ABSTRACT

The top of a buried well casing made of magnetic material is located by logging, in test holes drilled in the vicinity, vertical magnetic logs which show peak magnetic intensity at the depth of the well casing top and horizontal magnetic logs made with vertically spaced magnetometers whose outputs are subtracted to cancel out the effect of the earth's magnetic field and thus develop peak intensity horizontal lines which, from two or more test holes, intersect at the horizontal location of the well casing. The test holes are drilled and logged successively so as to pinpoint the location of the buried casing. Alternatively, the first derivative signal from the spaced magnetometers comprising the vertical log is scaled to indicate the horizontal distance from the first test hole to the well casing and the second hole is drilled at that distance along the peak intensity horizontal line of the horizontal log.

5 Claims, 5 Drawing Figures

PATENTED JUL 10 1973  3,745,446

MAGNETIC LOGGING METHOD OF LOCATING LOST WELLS

This invention relates generally to well logging methods and more particularly concerns a logging method for magnetically locating buried well casings.

Until recent years, after an oil or gas well was abandoned, the normal procedure was to "shoot off" the top 10 to 80 or so feet of casing, pull out the severed casing and level off the location with a bulldozer or similar implement. All too often, survey or other records locating the former wells are incomplete, or sufficiently inaccurate to make location of the buried casings difficult.

Former oil fields have become very attractive as underground gas storage fields. The geological formation which originally created the oil field provides a natural underground reservoir permitting large quantities of gas to be economically stored. When a field is reworked for this purpose, it is highly desirable to locate all of the former wells piercing the formation, either to employ them as controlled gas conduits or to plug them up and thus prevent gas leakage from the storage region. Fields used for gas storage which still have "lost" wells not only have uneconomical leaks, but the escaping gas often pollutes neighboring water supply wells.

When it is appreciated that a single field can easily have many hundreds of former wells, with perhaps as many as one-half of these being "lost", the magnitude and scope of the problem can be better understood. While the buried casings are normally formed of magnetic material, efforts to use magnetic intensity sensors, i.e., magnetometers, at the ground surface have not proven very successful — particularly with respect to the deeper casing tops.

Accordingly, it is the primary aim of the invention to provide a method for reliably locating the tops of buried former well casings. In more detail, it is an object of the invention to provide a method of the above kind that relies on magnetometers but which easily and efficiently avoids the effects of the earth's magnetic field so that accurate, highly sensitive data can be obtained.

It is a further object to provide a method as characterized above which is relatively inexpensive, requiring little earth moving or hole drilling.

Other objects and advantages of the invention will become apparent upon reading the following detailed description and upon reference to the drawings, in which.

While the invention will be described in connection with a preferred procedure, it will be understood that I do not intend to limit the invention to that procedure. On the contrary, I intend to cover all alternatives, modifications and equivalents as may be included within the spirit and scope of the invention as defined by the appended claims.

Figure 1:
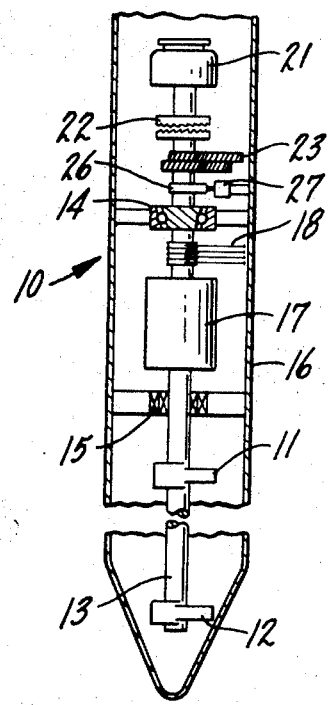
FIG. 1 is a schematic section of a logging tool of the type used in the practice of the method embodying the invention.

Turning first to FIG. 1, there is shown a representative logging tool 10 intended for use in the practice of the invention. The sensing elements of the tool 10 are a pair of magnetometers 11 and 12 preferably spaced vertically from one to five feet and mounted on a shaft 13 journalled in bearings 14 and 15 within a non-magnetic tool housing 16. The magnetometers 11, 12 are electrically connected to appropriate electronics in a package 17 which, in turn, is electrically connected through commutators 18 to the exterior of the housing 16 and then to readout devices such as strip charts at the ground surface. The magnetometers 11, 12 are of the conventional type which "look" in the direction in which they are aimed, in this case horizontally and in the same vertical plane when in use, and which react to the intensity of magnetic flux detected.

Figure 2:
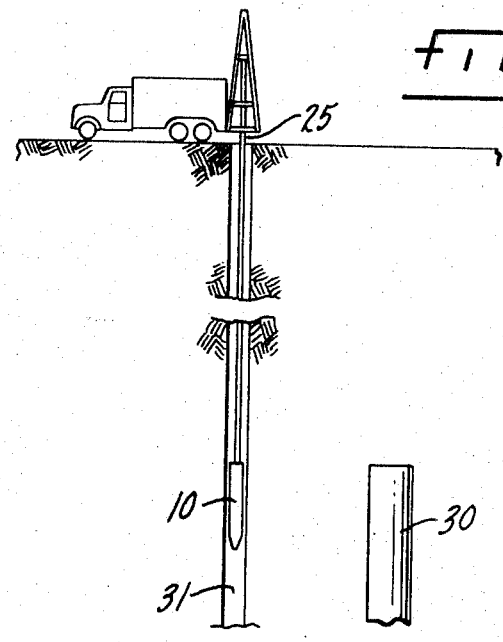
FIG. 2 is a schematic section showing the logging precedure with respect to a buried well casing.

In order to generate a horizontal log in a horizontal plane comparing magnetic intensity with angle from a known reference direction, the initial orientation of the tool 10 is established and the magnetometers 11, 12 are rotated in unison through a full 360° circle. In the illustrated arrangement, magnetometer rotation is achieved by pulsing a rotary solenoid 21 which, when energized, engages a clutch 22 and, through reduction gearing 23, steps the shaft 13. The stroke of the solenoid 21 coupled with the mechanical reduction of the gearing 23 rotates the shaft 13 in steps on the order of 5°. Orientation of the tool 10 is established by suspending the tool for logging on a small diameter tubing string 25 (see FIG. 2) formed of non-magnetic material, and utilizing a cam 26 on the shaft 13 to actuate a switch 27 mounted on the housing 16. The tubing 25 holds the housing 16 to an angle about a vertical axis which can be seen at the ground surface, and actuation of the switch 27 establishes the initial angular position of the magnetometers 11, 12 relative to the housing 16. In this way, stepping of the magnetometers can be initiated from a known reference direction and a complete 360° plot comparing magnetic intensity with angle from that known reference direction can be generated.

A vertical magnetic log can also be run using the tool 10 and, as is normal well logging practice, the tool 10 is first lowered to the bottom of a test hole and then pulled upwardly with the magnetometer output being plotted against the decreasing depth of the tool.

Figure 3:
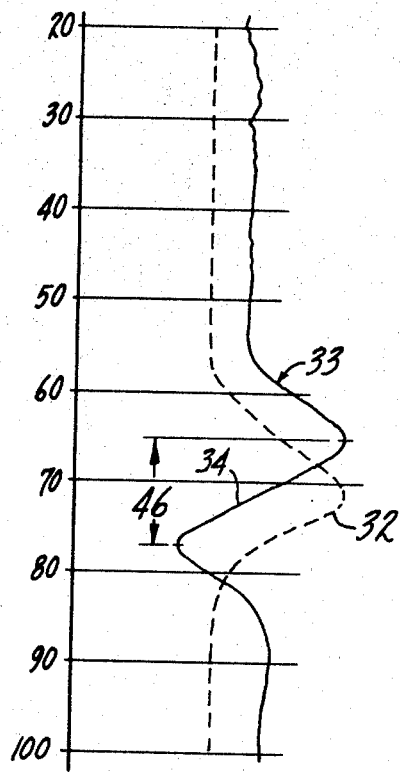

In the practice of the present method, the general vicinity of a buried well casing 30 is known and the casing 30, being of magnetic material, develops a slight permanent magnetism in the earth's magnetic field together with creating some distortion of that field. The total effect is that of a long, but weak, bar magnet with the lines of flux being most dense at the top of the casing 30. As a first step, and knowing the general location of the casing, a vertical test hole 31 is drilled in the vicinity which, if necessary, is lined with a non-magnetic casing material like polyvinychloride. A vertical log is run, as explained above, comparing magnetic intensity with depth. In theory, such a log should result in a bell curve 32 (see FIG. 3) showing peak intensity at the depth of the casing top where flux density is greatest but, using the tool 10, the two signals from the vertically spaced magnetometers 11, 12 are summed so that the combined signal at the ground surface is the first derivative of magnetic intensity, resulting in a plot line 33. Of course, knowing that the derivative is being plotted, the line 33 is interpreted to be indicative of the depth of the casing top with the depth being indicated by the midportion of an oppositely shouldered sloping plot line portion 34.

Figure 4:
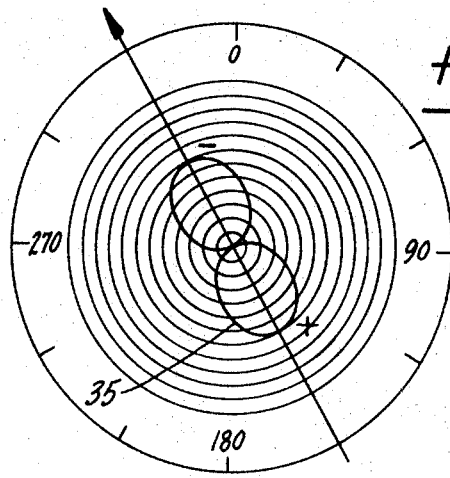
FIGS. 3 and 4 show differing magnetic intensity plots resulting from the kinds of logs taken in the practice of the invention.
Figure 5:
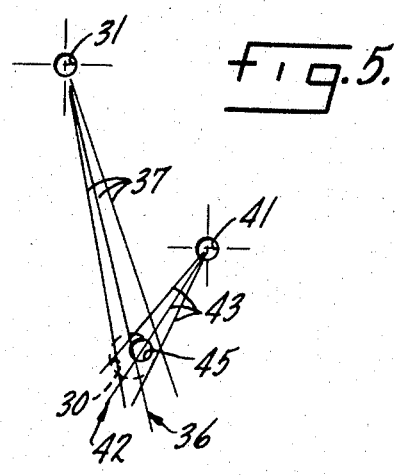
FIG. 5 schematically shows a plot of test holes, logged data and the buried casing.

Carrying forward the present method, a horizontal magnetic log is generated in the test hole 31 comparing magnetic intensity with angle from a known direction, the log being made in the manner described above by holding the tool at a given depth and given angular orientation on a string of pipe 25, and pulsing the rotary solenoid 21 so as to sweep the pair of magnetometers 11, 12 through a full circle. By summing (i.e., subtracting) the output signals of the vertically spaced magnetometers, the summed signal is a measure of the gradient of the magnetic effect produced by the buried casing 30, and the influence of the ambient magnetic field of the earth is cancelled out. Making a polar plot of the horizontal log gives a figure eight plot line 35 (see FIG. 4) whose axis points to the casing. In the northern hemisphere, the top of the buried casing would be equivalent to the south pole of a vertical bar magnet and this negative polarity indicates the direction in which the polar plot axis is pointing. Thus, the plot of the peak intensity of the vertical log and the direction of peak intensity of the horizontal log is indicative of the depth and position of a first horizontal line 36 (see FIG. 5) on which the top of the casing 30 is located.

Preferably, several such horizontal logs are taken in the test hole 31 at various depths just above the indicated depth of the casing top, and the angular position of the line 36, on which the casing top is assumed to be, is taken as the average of the lines 37 indicated by the several logs. A horizontal directional log made exactly at the casing top depth, i.e., with the magnetometers 11, 12 evenly spaced above and below the casing top, tends to be unreliable and since the precise depth of the casing top will not be known, if is desirable to run more than one log just above the indicated depth of the casing top.

Continuing with the method of the invention, a second vertical test hole 41 is drilled to one side but near the horizontal line 36 and also near the indicated vicinity of the well casing 30. Horizontal logs of the kind already described are generated in the second test hole 41, and the average horizontal line 42 is plotted to intersect with the similar line 36 from the first test hole 31, the point of intersection being indicative of the horizontal location of the casing top. Again, several horizonal logs are preferably made in the test hole 41 with the line 42 being developed as the average of the resulting indicated lines 43.

To physically find the casing top, a third vertical hole 45 is drilled at the indicated location of the casing 30. If the casing is not immediately found, additional logs of the kind already referred to can be made in the third hole 45 to guide laterally corrective drilling of the hole 45 into the top of the casing.

Under favorable conditions, that is, when good clear signals are being obtained, an alternate method of the invention can be practiced in which the second test hole is directed into the well casing. It is theoretically the case, and may be taken as empirically true, that the scaled spacing 46 from peak to peak of the opposite shoulders of the sloping derivative plot line 33 is about 1.2 times the distance between the test hole in which the log is run and the casing causing the anomaly — so long as the spacing 46 exceeds the vertical spacing of the magnetometers 11, 12. Thus, multiplying the spacing 46 scaled in feet times 0.833 will closely approximate the number of feet between the test hole and the buried casing. A single test hole will therefore produce a horizontal log indicative of a line from the test hole to the casing and a vertical log indicative of both a horizontal distance between the hole and the casing, and a depth for the casing top. A second test hole can reach the casing by being drilled at the computed distance along the horizontal plot line to the indicated depth.

Those familiar with this art will appreciate that the method described above is relatively inexpensive to perform. Little earth working is required, particularly as compared with the practice of simply scraping away earth until the top of the buried well casing is located. Once the buried casing is found, appropriate reworking of the former well can be initiated.

I claim as my invention:

1. A method of locating the top of a buried well casing made of magnetic material comprising, in combination, the steps of drilling a vertical test hole in the vicinity of said casing, generating a horizontal magnetic log in a horizontal plane from a point down said hole comparing magnetic intensity with angle from a known reference direction, running a vertical magnetic log along said test hole comparing depth against magnetic intensity, plotting the peak intensity on the vertical log and direction of peak intensity on the horizontal log as being indicative of the depth and position of a first horizontal line on which the casing top is located, drilling a second vertical test hole to one side but near said first horizontal line and position of a first horizontal line on which the casing top is located, drilling a second vertical test hole to one side but near said first horizontal line and to the indicated vicinity of the well casing, generating a second horizontal log in a horizontal plane comparing magnetic intensity with angle from a known reference direction, plotting a second horizontal line and its intersection with the first such line as being indicative of the horizontal location of said casing, drilling a third test hole to the indicated location of said well casing top, and repeating said vertical and horizontal logs in said third hole, if necessary, to guide corrective drilling of said third hole into said casing.

2. The method of claim 1 in which said horizontal logs are made by subtracting magnetic intensity readings from two vertically spaced horizontally sensing magnetometers so as to cancel out the effect of the ambient magnetic field of the earth.

3. The method of claim 2 in which said horizontal logs are made by rotating said magnetometers in unison through 360°.

4. The method of claim 1 in which said horizontal logs are repeated in the same test hole at several depths just above the indicated depth of said well casing top and said horizontal lines are developed as an average of the lines indicated by the logs taken at said several depths.

5. A method of locating the top of a buried well casing made of magnetic material comprising, in combination, the steps of drilling a vertical test hole in the vicinity of said casing, generating a horizontal magnetic log in a horizontal plane from a point down said hole comparing magnetic intensity with angle from a known reference direction, running a vertical magnetic log along said test hole comparing depth against the difference in magnetic intensity readings from two vertically spaced horizontally sensing magnetometers, plotting the direction of peak intensity on the horizontal log as indicative of a horizontal line running from the test hole to the casing top, plotting the peak intensity on the vertical log in terms of the first derivative of magnetic intensity from said spaced magnetometers so as to produce an oppositely shouldered sloping plot line whose midportion is indicative of the depth of the casing top and the spacing of the shoulders is indicative of the distance between the test hole and the casing top, and drilling a second hole at said distance along said horizontal line to said depth so as to drill into said casing.

* * * * *